United States Patent
Mathews et al.

(10) Patent No.: US 11,762,808 B2
(45) Date of Patent: Sep. 19, 2023

(54) DELETION OF SNAPSHOT OF FILESYSTEM

(71) Applicant: EMC IP Holding Company LLC, Hopkinton, MA (US)

(72) Inventors: Alexander S. Mathews, Morganville, NJ (US); Ahsan Rashid, Edison, NJ (US); Walter Forrester, Berkeley Heights, NJ (US); Morgan A. Clark, South Orange, NJ (US); Soumyadeep Sen, Summit, NJ (US); Rohit K. Chawla, Scotch Plains, NJ (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/506,234

(22) Filed: Oct. 20, 2021

(65) Prior Publication Data
US 2023/0118349 A1    Apr. 20, 2023

(51) Int. Cl.
*G06F 16/11* (2019.01)
*G06F 16/13* (2019.01)
*G06F 16/18* (2019.01)

(52) U.S. Cl.
CPC .......... *G06F 16/128* (2019.01); *G06F 16/134* (2019.01); *G06F 16/1873* (2019.01)

(58) Field of Classification Search
CPC ... G06F 16/128; G06F 16/134; G06F 16/1873
USPC ........................................................ 707/692
See application file for complete search history.

(56) References Cited

U.S. PATENT DOCUMENTS

| | | | |
|---|---|---|---|
| 7,930,508 B2* | 4/2011 | Giampaolo | G06F 16/1734 711/170 |
| 8,032,498 B1 | 10/2011 | Armangau et al. | |
| 8,407,265 B1 | 3/2013 | Scheer et al. | |
| 8,407,625 B2 | 3/2013 | Cohen et al. | |
| 8,412,688 B1 | 4/2013 | Armangau et al. | |
| 8,938,425 B1* | 1/2015 | Armangau | G06F 16/128 707/639 |
| 9,959,280 B1* | 5/2018 | Whitehead | G06F 16/13 |
| 10,482,065 B1* | 11/2019 | Armangau | G06F 16/1748 |
| 11,099,940 B1* | 8/2021 | Patel | G06F 11/1469 |
| 2008/0046432 A1* | 2/2008 | Anderson | G06F 16/174 |
| 2008/0059541 A1* | 3/2008 | Fachan | G06F 16/174 |
| 2008/0222152 A1* | 9/2008 | Godbole | G06F 16/10 |
| 2009/0055604 A1* | 2/2009 | Lemar | G06F 16/174 711/E12.001 |
| 2012/0095971 A1* | 4/2012 | Shyam | G06F 16/1774 707/690 |
| 2017/0357659 A1* | 12/2017 | Mackovitch | G06F 16/162 |

(Continued)

*Primary Examiner* — Phuong Thao Cao
(74) *Attorney, Agent, or Firm* — Amin, Turocy & Watson, LLP

(57) ABSTRACT

Technology described herein can perform deletion of a snapshot or portion thereof. In an embodiment, a system can comprise a processor and a memory that stores executable instructions that, when executed by the processor, facilitate performance of operations. The operations can comprise, to delete a snapshot, or a portion of a snapshot, of a real filesystem, reading an inode mapping file (IMF) of the snapshot that indexes a virtual inode number (VIN) corresponding to a real inode. The operations further can comprise identifying the real inode of the snapshot referenced by the VIN, identifying a file object corresponding to the real inode, and deleting the file object from the snapshot.

20 Claims, 10 Drawing Sheets

(56) References Cited

U.S. PATENT DOCUMENTS

2020/0065400 A1\* 2/2020 Desai ................... G06F 16/128
2020/0334111 A1\* 10/2020 Potnis .................. G06F 16/128

\* cited by examiner

600

To delete a snapshot, or a portion of a snapshot of a real filesystem, reading an inode mapping file (IMF) of the snapshot that indexes a virtual inode number (VIN) to a real inode. 602

Identifying the real inode of the snapshot referenced to the VIN. 604

Identifying a file object (e.g., a data block) corresponding to the real inode. 606

Determining whether the file object is shared with another snapshot or is owned exclusively by the snapshot. 608

Deleting the file object from the snapshot. 610

Releasing a weight of the VIN corresponding to the file object, wherein the weight is released to the real inode corresponding to the VIN, in accordance with mapping of the IMF. 612

Deleting a directory of the snapshot, wherein the file object is the directory, by addressing one or more data blocks or metadata blocks defining the directory. 614

Identifying, by a system comprising a processor, file objects of a snapshot via reading of an inode mapping file associated with the snapshot. 802

↓

Releasing at least some of the file objects, wherein the releasing does not comprise updating a namespace of the snapshot. 804

↓

Classifying a directory of the snapshot as a version file. 806

↓

Truncating the directory without reading or writing of the directory. 808

↓

Returning a weight of a virtual inode referencing a first file object, of the file objects that are released, to a real inode mapped to the virtual inode, in accordance with mapping at the inode mapping file. 810

↓

Determining which first ones of the file objects are individually shared with another snapshot and which second ones of the file objects are owned exclusively by the snapshot. 812

↓

Performing the releasing, or alternatively performing a truncating, for respective ones of the first ones and second ones of the file objects depend on a result of the determining. 814

↓

Performing the releasing, or alternatively performing a truncating, of multiple file objects of the file objects in parallel at a given point in time. 816

FIG. 8

DELETION OF SNAPSHOT OF FILESYSTEM

BACKGROUND

Contemporary data storage systems can provide for snapshots of a namespace of a filesystem. A namespace is a point-in-time collection of files, presented as a single virtual filesystem to a user, so that a user can access a file irrespective of physical location of the file or respective directory. A snapshot is a point-in-time-copy of a file or filesystem. When a snapshot is created, e.g., based on a primary filesystem, the snapshot shares files with the primary filesystem. In general, in a filesystem that uses real index nodes (inodes) to store file metadata that references corresponding files' data, the instances of a shared file, such as via a primary filesystem view and a snapshot view can reference the same real inode and thus can index the same shared file data.

SUMMARY

The following presents a simplified summary of the disclosed subject matter to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can comprise a processor and a memory that stores executable instructions that, when executed by the processor, facilitate performance of operations. The operations can comprise, to delete a snapshot, or a portion of a snapshot, of a real filesystem, reading an inode mapping file (IMF) of the snapshot that indexes a virtual inode number (VIN) corresponding to a real inode. The operations further can comprise identifying the real inode of the snapshot referenced by the VIN, identifying a file object corresponding to the real inode, and deleting the file object from the snapshot.

An example a method can comprise identifying, by a system comprising a processor, file objects of a snapshot via reading of an inode mapping file associated with the snapshot. The method further can comprise releasing at least some of the file objects, wherein the releasing does not comprise updating a namespace of the snapshot.

An example of a non-transitory computer-readable medium can comprise executable instructions that, when executed by a processor, facilitate performance of operations. The operations can comprise deleting a snapshot of a filesystem, the deleting being performed without reading or writing of any directory of the snapshot. The deleting a snapshot can comprise deleting, from the snapshot, a first file object referenced to a virtual inode of the snapshot. The deleting a snapshot can comprise deleting, from the snapshot, a data block or metadata block comprised by a real inode corresponding to the virtual inode. The deleting a snapshot can comprise classifying a directory of the snapshot as a version file being a second file object, and deleting, from the snapshot, the second file object.

In one or more embodiments of the aforementioned system, method and/or non-transitory computer-readable medium, the reading of the IMF of the snapshot can be performed without any reading of or writing to any directories of the snapshot.

In one or more embodiments of the aforementioned system, method and/or non-transitory computer-readable medium, the snapshot or portion thereof can be deleted without any updating of a namespace of the snapshot.

BRIEF DESCRIPTION OF THE DRAWINGS

The technology described herein is illustrated by way of example and not limited in the accompanying figures in which like reference numerals indicate similar elements.

FIG. 6 illustrates a flow diagram of example operations of a process that can facilitate deletion of a snapshot or one or more portions of a snapshot, in accordance with one or more embodiments described herein.

FIG. 8 illustrates a flow diagram of example operations of yet another process that can facilitate deletion of a snapshot or one or more portions of a snapshot, in accordance with one or more embodiments described herein.

DETAILED DESCRIPTION

Overview

Figure 1:
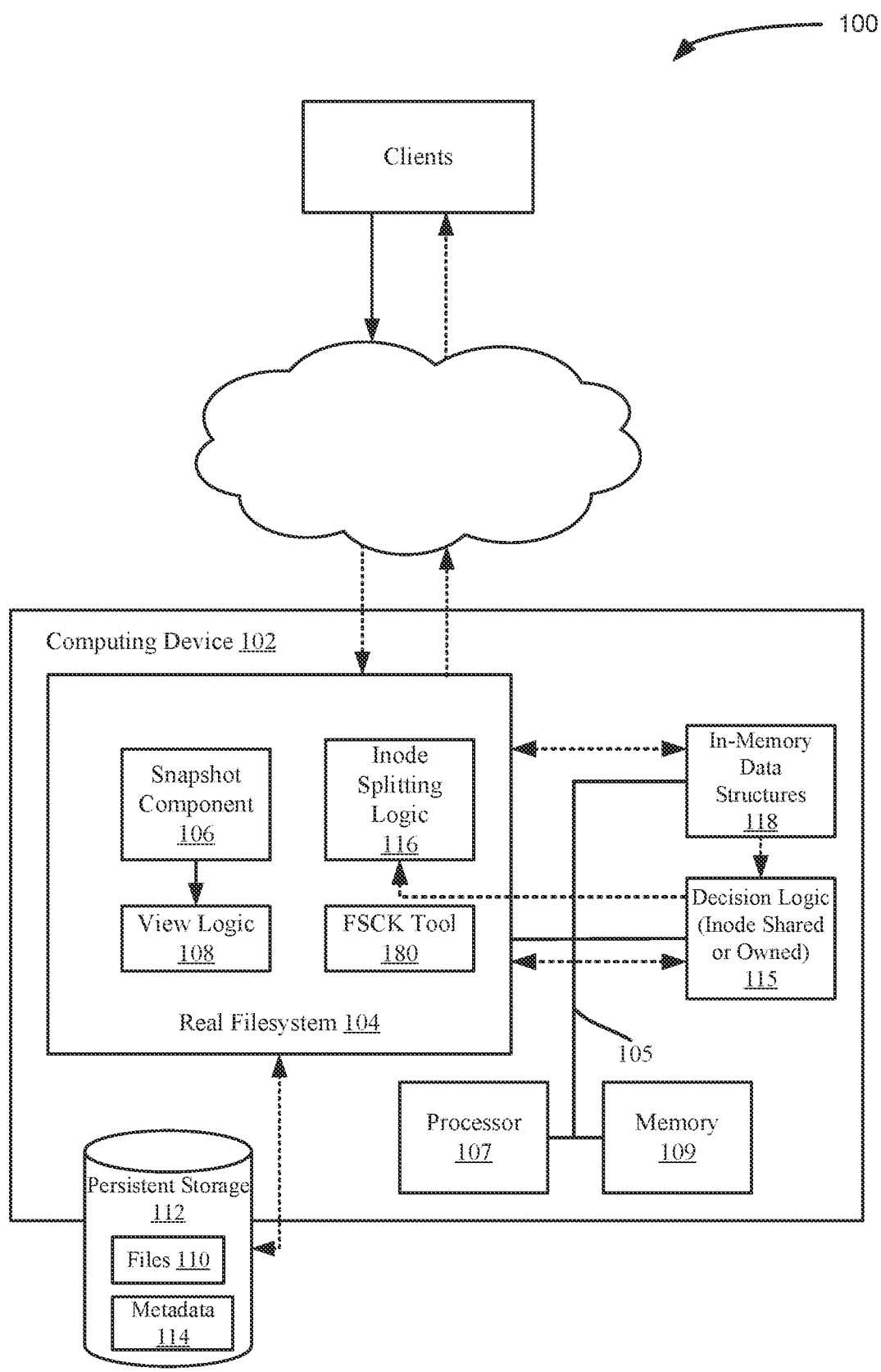
FIG. 1 illustrates a block diagram representation of example components and data-related operations in a data storage system that can facilitate snapshots via shared inodes, in accordance with various embodiments and implementations described herein.

The technology described herein is generally directed towards an efficient process to delete a snapshot and/or one or more objects of a snapshot that makes up for one or more deficiencies of existing deletion process techniques. As will be understood, the technology described herein can include evaluating select data maintained/cached in-memory (e.g., fast RAM or the like, relative to slower storage such as persistent storage), which provides a rapid and accurate determination of whether a file is shared or not.

It should be understood that any of the examples herein are non-limiting. As one example, one or more embodiments of technology described herein can be described using a Unix filesystem, in which virtual inodes can map to real inodes to facilitate file sharing across different views (e.g., snapshots) of a real filesystem's files. However, the technology described herein additionally and/or alternatively can be applied to other data storages/filesystems. As such, any of the embodiments, aspects, concepts, structures, functionalities and/or examples described herein are non-limiting. The described technology can be used in various ways that can provide benefits and advantages in computing and/or data storage in general.

For a snapshot, an inode mapping file (IMF) can be generated that can index information (e.g., data and/or metadata) regarding the real inodes. When a snapshot is generated, virtual inodes can be created that each can map to an individual real inode. This mapping metadata can be indexed at the IMF and referenced by a snapshot control system.

When a write operation to data or metadata of a file occurs, a real file (e.g., of the real filesystem) location can be changed. A change to the file metadata can therefore cause a copy of a respective real inode, such that a snapshot version of the file is preserved. As such, the real inode would no longer be shared. Data blocks related to a prior version of a file can be saved and linked to the virtual inode of the snapshot. This update can be written into and stored at the IMF, thereby maintaining a link between a respective virtual inode and a respective real inode of the file. That is, a virtual inode number (VIN) of a virtual inode can be linked in the IMF to a real inode number (RIN) of a corresponding real inode.

When a snapshot is deleted, such as to re-capture space, a file directory is typically walked from root to leaves to delete one or more file objects (e.g., files referenced within directories and/or directories themselves) at a time, including deleting data blocks and/or metadata block from the snapshot. The deletion of a snapshot can be for one or more various reasons including, but not limited to recapture of storage space, being created for executing an offline backup and then discarded after the backup is completed, created to do remote replication and discarded once the replication is completed, and/or in response to a scheduler of a snapshot controller. This deletion process further can include, in response to the deletion of each file object, rewriting/updating the associated namespace having a total compendium of the contents of the associated directories. This rewriting/updating of the associated namespace can include updating block pointers, dependencies and/or other linkages between objects.

The deletion process can be very resource and time intensive. Additionally, the rewriting/updating of the associated namespace can serve little purpose where further deletion will be executed, such as of an entire snapshot, in that the namespace will continue to be changed with the deletion of each object. That is, a point-in-time update to a namespace can become obsolete mere seconds after the update in view of further deletion of additional objects related to the respective snapshot.

Referring still to snapshots generally, and to the use, generation and/or modification of snapshots, in a large filesystem with many concurrent users, deletion of a snapshot or even of a portion of a snapshot can be memory intensive, processer intensive, energy intensive and/or time intensive. In addition, the deletion can be at least partially wasteful due to writing to a namespace that can be continually changing in view of the deletion.

One or more embodiments of devices, systems, methods and/or non-transitory machine-readable mediums are described herein that can provide a more efficient and/or faster deletion process related to a snapshot. The one or more embodiments described herein can execute respective snapshot deletion employing less memory, processor power, energy and/or time. This can be facilitated at least in part due to bypassing writing and/or updating a namespace associated with the respective snapshot, at least until or at such time that deletion processing is completed. That is, the namespace can be allowed to be invalid during snapshot deletion.

Further, instead of traversing a directory tree to delete objects, and thus affecting the namespace, the IMF of a snapshot can be employed to facilitate the deletion processing. That is, the IMF of a snapshot includes an index of related VINs and RINs in addition to other useful information (e.g., data and/or metadata) that can be employed to delete a snapshot or one or more file objects of a snapshot. Thus, one or more embodiments described herein can generally avoid reading directories to identify contained files and directories for being deleted, in addition to avoiding writing to directories. Indeed, even directories can be treated as version files comprised of one or more blocks, such as data blocks and/or metadata blocks, where metadata blocks can be sub-units of data blocks.

Briefly, a deletion processing system architecture described herein can delete a snapshot of a real filesystem, by reading an IMF of the snapshot that comprises a set of VINs. The system architecture can identify one or more virtual inodes of the snapshot based on the VINs, and thus can identify file objects corresponding to the virtual inodes. These file objects can be identified employing the mapping of the IMF to track VINs of the virtual inodes to RINs of real inodes, and thus to track file objects corresponding to the real inodes. These file objects can then be addressed, such as being truncated, including deleting metadata, or released from the snapshot, including releasing data blocks and/or metadata blocks, releasing dependencies and/or the like. Metadata defining (e.g., providing on-disk representation of) virtual inodes and directories themselves also can be deleted in this manner. Each directory can be treated as a version file. With respect to virtual inodes, respective weights thereof can be released to respective real inodes, thus allowing for updating of total weights of the real inodes.

As used herein, the term real inode refers to an inode of a filesystem, as compared to virtual inode that is an on-disk virtual representation of a real inode, also herein referred to as a mode. Metadata defining virtual inodes can be stored as part of data blocks of the respective real inodes, and thus the virtual inodes themselves are not considered as file objects. Rather, virtual inodes, also referred to herein as vnodes, are virtual representations against which operations can be performed.

As used herein, the term "entity" can refer to a machine, device, smart device, component, hardware, software and/or human.

As used herein, the term "cost" can refer to power, money, memory, processing power and/or the like.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, in with respect to any aforementioned and below mentioned uses, the term "in response to" can refer to any one or more states including, but not limited to: at the same time as, at least partially in parallel with, at least partially subsequent to and/or fully subsequent to, where suitable.

Example Architecture

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, it will be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architecture 100 as illustrated at FIG. 1, and/or systems thereof, can further comprise one or more computer and/or computing-based elements described herein with reference to an operating environment, such as the operating environment 1000 illustrated at FIG. 10. In one or more described embodiments, computer and/or computing-based elements can be used in connection with implementing one or more of the systems, devices, components and/or computer-implemented operations shown and/or described in connection with FIG. 1 and/or with other figures described herein.

Turning first to FIG. 1, an example of a system architecture is illustrated at 100, with description being provided below. While referring here to one or more processes, operations, facilitations and/or uses of the non-limiting system architecture 100, it will be appreciated that description provided herein, both above and below, also can be relevant to one or more other non-limiting system architectures described herein.

The non-limiting system architecture 100 can facilitate a process to delete a snapshot or portion of a snapshot. FIG. 1 shows a system architecture 100 comprising a computing device 102 (which can be a group of devices such as an array of distributed computing nodes) that includes a real filesystem 104 as described herein. Typically, such computing devices can comprise operating systems, drivers, network interfaces and/or so forth, however for purposes of brevity, only components generally relevant to snapshots are illustrated in FIG. 1.

In general and as described herein, the real filesystem 104 can support a snapshot component 106, e.g., as a native filesystem component as shown, or alternatively as an external component coupled to the filesystem. When invoked, the snapshot component 106 can produce a copy of the real filesystem's snapshotted files as described herein, to provide different views of the real filesystem 104, as managed by view logic 108. In general files 110 in persistent storage 112 can be shared by having different views' virtual inodes (e.g., virtual inodes of different snapviews) reference the same real inode (stored as metadata 114) for each snapshotted file.

View logic 108 can separate the real filesystem's real files into different virtual views of the real filesystem 104. For example, a first view of the filesystem namespace can access files A, B and C, a second view can access files B, D and F, and so on; file B is thus shared by at least the first view and the second view.

When an I/O operation to a file corresponding to a view is requested by a client (device) or other entity, a filesystem identifier (ID) and a virtual inode number (VIN) for that view is specified in the file handle that is used to access the file. The VIN maps to a real inode referenced by a real inode number (RIN), by which the real file contents are accessed, such as employing a respective inode mapping file (IMF).

For a write operation, decision logic 115 as described herein (incorporated into or coupled to the filesystem 104) can be invoked to determine whether the real inode of the file is shared, such as corresponding to one or more virtual inodes. If so, inode splitting logic 116 can split the real inode by allocating a new real inode for the file to be modified by the write. As described herein, the decision logic 115 can access in-memory data structures to efficiently determine whether the real inode is shared or owned (not shared). This decision logic 115 can similarly be applied for virtual inodes.

Discussion now turns to the processor 107, memory 109 and bus 105 of the computing device 102.

For example, in one or more embodiments, computing device 102 can comprise a processor 107 (e.g., computer processing unit, microprocessor, classical processor and/or like processor). In one or more embodiments, a component associated with computing device 102, as described herein with or without reference to the one or more figures of the one or more embodiments, can comprise one or more computer and/or machine readable, writable and/or executable components and/or instructions that can be executed by processor 107 to facilitate performance of one or more processes defined by such component(s) and/or instruction(s). In one or more embodiments, the processor 107 can comprise the view logic 108, snapshot component 106, inode splitting logic 116 and/or decision logic 115.

In one or more embodiments, the computing device 102 can comprise a machine-readable memory 109 that can be operably connected to the processor 107. The memory 109 can store computer-executable instructions that, upon execution by the processor 107, can cause the processor 107 and/or one or more other components of the computing device 102 (e.g., view logic 108, snapshot component 106, inode splitting logic 116 and/or decision logic 115) to perform one or more actions. In one or more embodiments, the memory 109 can store computer-executable components (e.g., view logic 108, snapshot component 106, inode splitting logic 116 and/or decision logic 115).

Computing device 102 and/or a component thereof as described herein, can be communicatively, electrically, operatively, optically and/or otherwise coupled to one another via a bus 105 to perform functions of non-limiting system architecture 100, computing device 102 and/or one or more components thereof and/or coupled therewith. Bus 105 can comprise one or more of a memory bus, memory controller, peripheral bus, external bus, local bus and/or another type of bus that can employ one or more bus architectures. One or more of these examples of bus 105 can be employed to implement one or more embodiments described herein.

In one or more embodiments, computing device 102 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the non-limiting system architecture 100 can reside in the cloud, and/or can reside locally in a local computing environment (e.g., at a specified location(s)).

In addition to the processor 107 and/or memory 109 described above, computing device 102 can comprise one or more computer and/or machine readable, writable and/or executable components and/or instructions that, when executed by processor 107, can facilitate performance of one or more operations defined by such component(s) and/or instruction(s).

Figure 2:
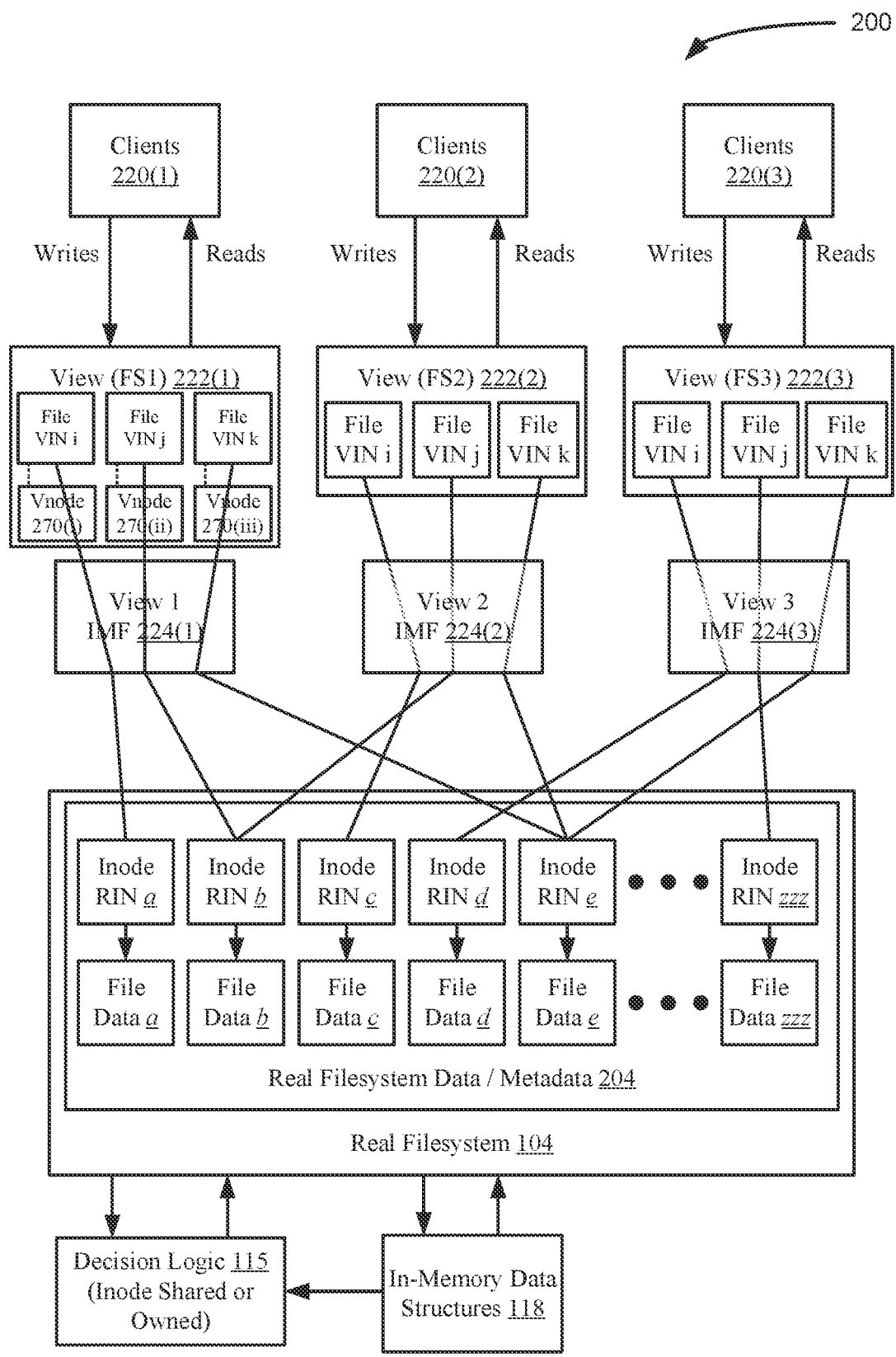
FIG. 2 illustrates an example representation of how virtual inodes of views map to real inodes to facilitate sharing of file data, in accordance with various embodiments and implementations described herein.

Turning now to FIG. 2, generally illustrated are additional concepts of views and shared files at diagram 200. Clients (e.g., groups of clients 220(1)-220(3) in the example) can be associated with respective views 222(1)-222(3) corresponding to virtual filesystems FS1-FS3, respectively, such as different snapshots or snapviews. To a client a view of a snapshot can appear to be a filesystem of files, although in actuality a view can be a smaller virtual subset of a real filesystem's data and metadata 204. In the example of FIG. 2, three groups of clients and views are shown, although it will be appreciated that any practical number of views can present in a given scenario.

The respective views 222(1)-222(3) have respective IMFs 224(1)-224(3) that map virtual inodes to the real inodes of the filesystem. This mapping can facilitate file sharing, as, for example, the real inodes numbered RIN b and RIN e (where b and e represent any appropriate real inode numbers) can correspond to file b data and file e data, respectively, which can be mapped to by more than one VIN among the views (e.g., snapshots).

When a write operation comes into the real filesystem 104 from a view, the write operation's file handle can identify a VIN, which can be mapped to a corresponding RIN associated with respective file data of the real filesystem 104. The real filesystem 104 can use the decision logic 115 (e.g., to determine if a respective real inode is shared or owned), which can access the in-memory data structures 118, to determine if the real inode is shared or not. If shared, the inode splitting logic splits the real inode.

Referring still to both FIGS. 1 and 2, a deletion process of a snapshot or of a portion of a snapshot, such as one or more file objects thereof, will be described. File objects can be real filesystem files, directories, version files and/or the like. File objects can correspond to modes of the real filesystem. File objects each can be defined by stored blocks of the real filesystem, such as data blocks or metadata blocks. Metadata blocks can be sub-portions of data blocks. It will be appreciated that as described below, directories can be treated as version files, and thus as file objects for the purpose of the techniques employed by the snapshot component 106. Vnodes, although being on-disk virtual representations of inodes, still can be defined by metadata, such as of one or more data blocks or metadata blocks defining the respective modes to which the vnodes correspond.

For deletion of a snapshot, the aforementioned file objects and/or blocks can be addressed in a more efficient process than can be provided by existing techniques. The snapshot component 106 can facilitate the deletion process, including accessing, reading and/or employing an IMF, such as the View 1 IMF 224(1). The snapshot component 106 can access and/or store one or more deletion processes, such as deletion processes 600, 700 and/or 800 described below, to facilitate a snapshot deletion. The snapshot component 106 can facilitate one or more operations comprised by such deletion processes and/or can execute one or more operations comprised by such deletion processes. It will be appreciated that the deletion processes 600, 700 and/or 800 can be stored internally and/or externally to the computing device 102, such as where the deletion processes are accessible by the snapshot component 106 and/or processor 107 of the computing device 102.

It will be appreciated that a deletion process will now be described for a single snapshot view FS1. However, in one or more embodiments, the deletion process facilitated herein by the snapshot component 106 and/or other components of the computing device 102 (e.g., a respective processor) can be scalable. In one or more embodiments, the deletion process can be facilitated for more than one view at least partially in parallel with one another. This can be enabled at least in part due to the reduced cost of employing the deletion process described herein as compared to existing techniques.

Figure 3:
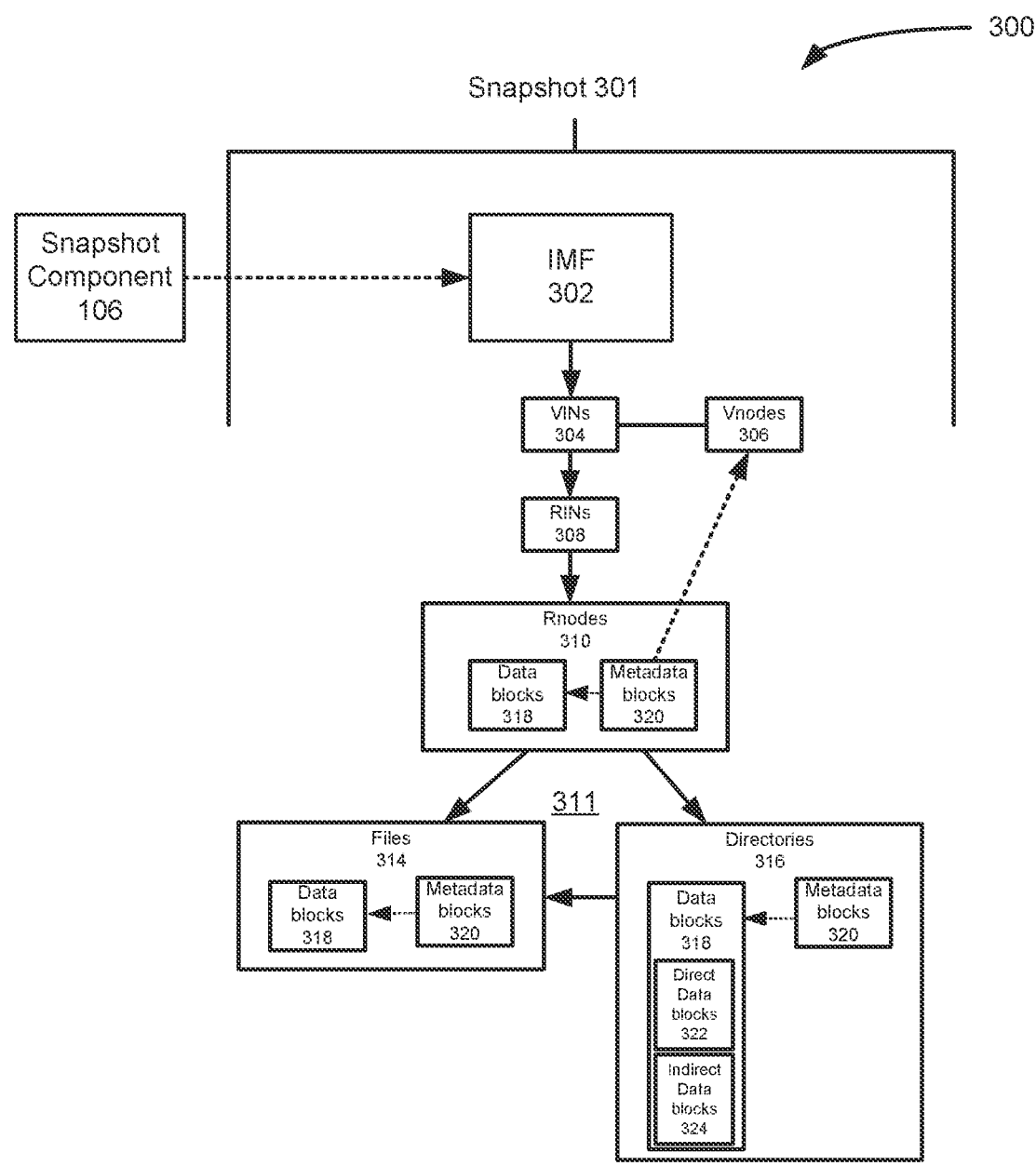
FIG. 3 illustrates a process flow diagram of identification of elements of a snapshot for deletion, in accordance with one or more embodiments described herein.

Turning now to FIG. 3 in particular, but still to FIGS. 1 and 2, the deletion process can include first identifying, such as by an administrating entity, a snapshot or a portion of a snapshot to delete. That is, while the one or more embodiments of snapshot deletion described herein above and below are directed to deletion of an entire snapshot, such embodiments also can be applicable to deletion of only a portion of a snapshot, such as less than a full snapshot.

FIG. 3 provides a process flow diagram employing elements similar to those of FIGS. 1 and 2. Accordingly, repetitive description of like elements and/or processes employed in respective embodiments is omitted for sake of brevity.

Employing the IMF 302 of the snapshot 301 of interest, the IMF 302 can be read, such as by the snapshot component 206. One or more features and/or functions of the IMF 302 are described below that also can be applicable to any other IMF, such as of the diagram 200.

The format of the IMF 302 can be a lookup table or any other suitable format. The IMF 302 can include an index of VINs 304 linked to RINs 308. Multiple VINs 304 from different IMFs can be linked to a same RIN 308. Additionally, RINs 308 can be indexed to modes 310, which modes can be indexed to file objects 311. One or more file objects can be linked to each mode, and thus to each RIN and associated VIN. File object 311, such as files 314 and/or directories 316 can be defined by data blocks 318 and/or metadata blocks 320. It will be appreciated that data blocks 318 and/or metadata blocks 320 of a directory 316 can be hidden from a client, but that these blocks can be present as on-disk representation of the directories 316 addressable for a snapshot deletion, for example. That is, it will be appreciated that any directory 316 can be treated similar to a version file for snapshot deletion, as will be described below in further detail.

With respect to the data blocks 318, such data blocks 318 (e.g., of modes 310, files 314 and/or directories 316) can include direct data blocks 322 and/or indirect data blocks 324. An indirect data block 324 can point to one or more other indirect data blocks 324 and/or direct data blocks 322.

It also will be appreciated that data blocks 318 and/or metadata blocks 320 defining the modes 310 can include data/metadata defining on-disk virtual inode 306 representations.

In view of the above, VINs 304 can be indexed to blocks (e.g., data blocks 318 and/or metadata blocks 320) of the file objects 311 via the RINs 308. That is, the VINs, links, references and/or dependencies of the IMF 302 can thus be read to determine and identify each file object 311 to assess and subsequently to delete each file object 311. Accordingly, the IMF 302 can be employed to identify files 314, directories 316 and/or virtual inodes defined by data blocks 318 and/or metadata blocks 320. It will be appreciated that in view of employing the IMF 302, the snapshot 301 deletion can be executed without the tedious and costly processes of walking one or more directory trees of one or more directories to locate the files, directories, inodes and/or associated data blocks.

Figure 4:
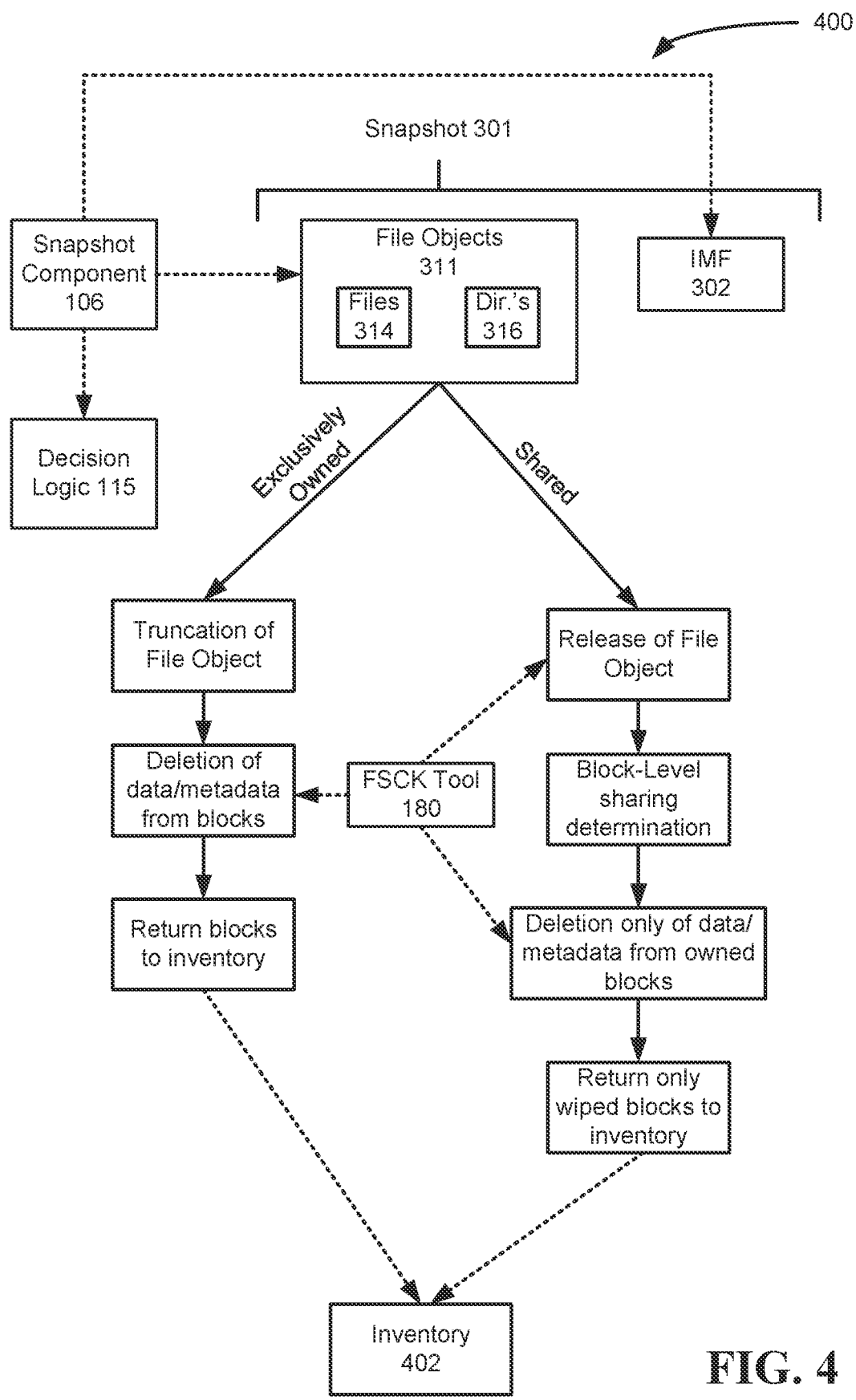
FIG. 4 illustrates a process flow diagram of determination of sharing for deletion of a file object of and/or indexed to a snapshot, in accordance with one or more embodiments described herein.
Figure 5:
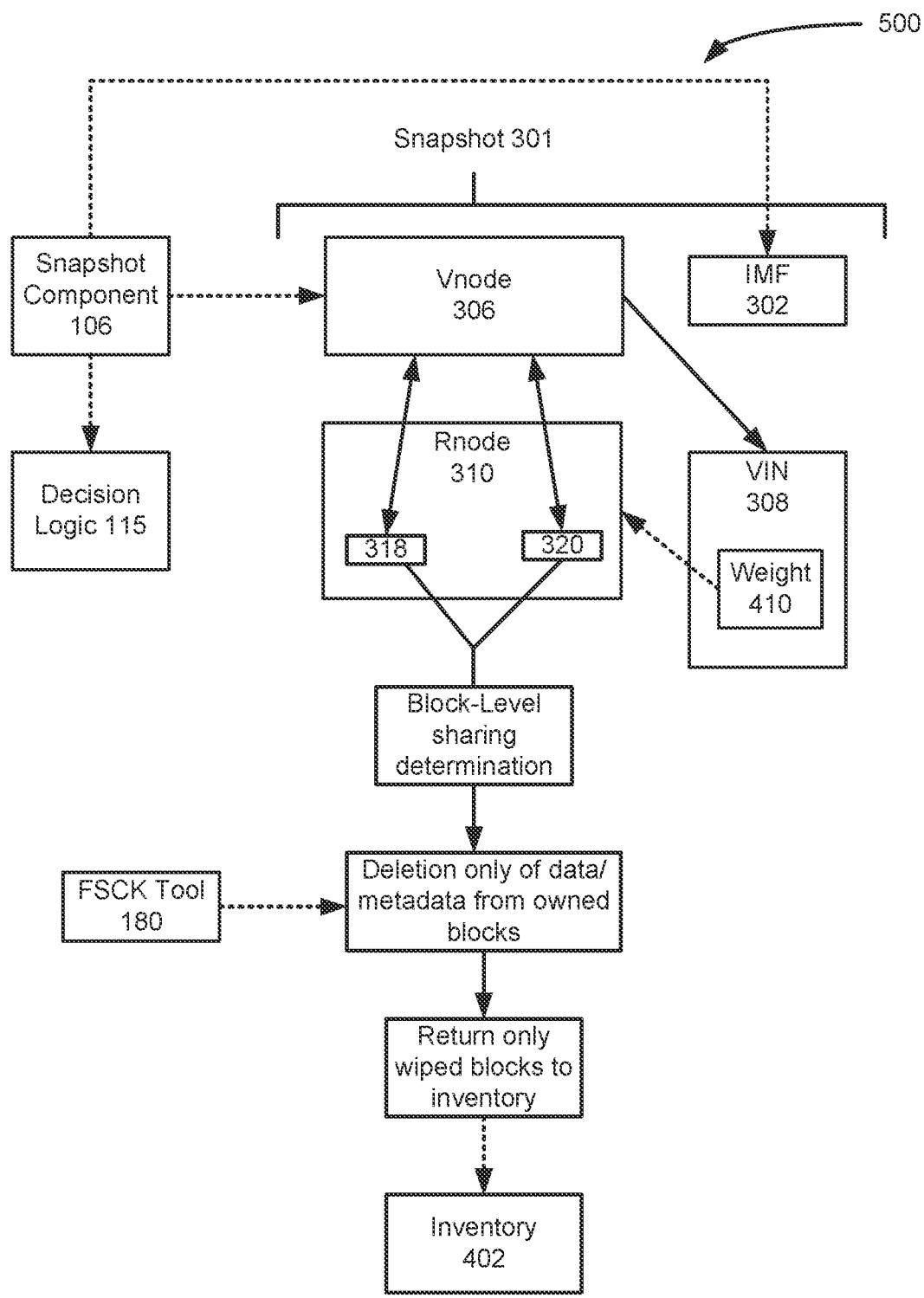
FIG. 5 illustrates another process flow diagram depicting deletion of a virtual inode from a snapshot, in accordance with one or more embodiments described herein.

Turning now to FIGS. 4 and 5, and still referencing FIG. 3, description turns to the assessment of file objects 311 and their subsequent deletion.

Referring first to deletion generally, it will be appreciated that a deletion can include releasing and/or truncating. Deleting can be defined as generally extricating a file object 311 from the snapshot 301, such as separating the file object 311 from the snapshot 301. As such the file object 311 will no longer be shared and/or owned by the snapshot 301. Releasing can be defined as a specific type of deletion where a file object 311 is extricated from the snapshot 301 but data/metadata of the file object 311 is not deleted from the real filesystem 104 or from one or more other snapshots, such as FS2 and FS3 of FIG. 2. Truncating can be defined as another specific type of deletion where a file object 311 is extricated from the snapshot 301 and also where data/metadata of the file object 311 is deleted. That is, the truncation generally is executed for a file object 311 that is owned exclusively by the snapshot 301 and not shared with other views (e.g., snapshots). Accordingly, deleting the data/metadata from the associated data blocks 318 and/or metadata blocks 320 will not affect other snapshots and can allow for return of the data blocks 318 and/or metadata blocks 320 to inventory for alternative use.

Turning now to the process diagram 400 illustrated at FIG. 4, once a file object 311 is ascertained (e.g., identified and/or located) employing the IMF 302, and regardless of whether the file object 311 is comprised by and/or defines a data file 314 and/or a directory 316, the snapshot component 106 can employ the decision logic 115 to determine whether the file object 311 is shared or owned. That is, the decision logic 115 can be employed to determine whether a file object 311 is shared with one or more other snapshots (e.g., in addition to snapshot 301), or whether the file object 311 is exclusively owned by the respective snapshot 301 being deleted, and thus is not shared with any other snapshots (e.g., other than snapshot 301).

In one or more embodiments, this determination can employ information at the IMF 302. In one or more embodiments, this determination can employ analysis of one or more weights assigned to a VIN that directly or indirectly references the file object 311. Any other suitable method to determine sharing can be employed, such as understood by one having ordinary skill in the art.

Based on a determining that a file object 311 is not shared with another snapshot, and thus is exclusively owned by the snapshot 301 being deleted, the snapshot component 106 can execute a truncation of the file object 311. The data/metadata of the file object can be deleted as it is not corresponded to another snapshot. This truncation can be performed without addressing the specific data blocks 318 and/or metadata blocks 320 themselves that define the file object 311 being truncated. Again, this is due to the file object 311 being exclusively owned. In view of the data/metadata being deleted from associated data blocks 318 and/or metadata blocks 310, these blocks can be returned to inventory 402 for subsequent alternative use.

Differently, based on a determining that a file object 311 is shared with another snapshot, the snapshot component 106 can execute a release of the file object 311. The data/metadata (blocks) of the file object 311 can be non-disturbed as it is corresponded to another snapshot. The associated data blocks 318 and metadata blocks 318 generally will majoratively not be returned to inventory. However, this determination can be based on a block-level sharing determination, such as employing the decision logic 115 by the snapshot component 106, of the associated data blocks 318 and metadata blocks 318. This determination can include determining whether any of the blocks themselves are exclusively owned by the snapshot 301, and thus can be wiped and returned to inventory 402.

For deletion of a directory referenced in the respective IMF, the directory can be classified as a version file (e.g., a file comprising and/or defined by one or more data blocks) and thus can be defined as a file object 311, as shown at FIG. 4.

Turning now to FIG. 5, illustrated is a process flow diagram depicting deletion of a virtual inode (vnode) 308 of the snapshot 301.

With respect to deletion of a virtual inode 308 indexed in the respective IMF 302, once all file objects 311 indexed to the virtual inode 308 are deleted, and thus all data blocks 318 and/or metadata blocks 320 defining those file objects 311 either are released or truncated, a vnode 308 itself can be deleted. That is the one or more data blocks 318 and/or metadata blocks 320 comprised by and/or defining the virtual inode itself can be assessed and deleted. It will be appreciated that these data blocks 318 and/or metadata blocks 320 can be one or more data blocks 318 and/or metadata blocks 320 of an associated real inode 310. Deletion of these blocks can include a block level sharing determination of whether the blocks 318, 320 are shared or owned by the associated real inode 310. Blocks 318, 320 that are owned can be wiped and returned to inventory 402. Blocks 318, 320 that are shared can be released from the mode 310, but not wiped.

This deletion process for a virtual inode 308 itself also can include the release of a weight 410 of a VIN 308 once all such file objects indexed to the virtual inode 308 are deleted from the snapshot 301. That is, the deletion process can include the release of the weight 410 assigned to a virtual inode 306 indexed to the VIN 308. The weight 410 can be returned to the real inode 310 indexed to the now-deleted virtual inode employing the VIN 308 in accordance with indexing of the respective IMF.

Turning now to each of FIGS. 4 and 5, it will be appreciated that a filesystem consistency check tool 180 (FSCK tool) still can perform one or more consistency checks to test a consistency of a file object 311, data block 318 and/or metadata block 320 being deleted. FSCK is a recovery operation that can be employed to determine corruption/non-corruption of data/metadata. FSCK can be employed to restore metadata consistency. It will be appreciated that FSCK can be employed separately and/or in conjunction with a snapshot deletion. The processor 107 can direct and/or control the FSCK tool 180 to bypass a typical namespace update with each consistency check. As indicated above, the namespace instead can be allowed to go invalid.

In a case where only a partial snapshot is being deleted (e.g., less than all file objects 311 of a snapshot 301), updating of a namespace can be paused and allowed to become invalid until snapshot deletion operations are completed. In one or more embodiments, the FSCK tool 180 can complete a namespace rewrite for the partial snapshot having been deleted, after the partial snapshot has been deleted.

Further, it will be appreciated that the performance of any of the aforementioned operations, including identifying file objects, locating file objects, determining sharing and/or the actual deleting can be performed in parallel with one or more other same operations or different operations of that list. The parallel operation can be performed for different locations of a same IMF, and thus for multiple file objects of a same snapshot in parallel. Additionally and or alternatively, the parallel performance can be executed for more than one snapshot (e.g., for deletion of more than one snapshot or for one or more portions of more than one snapshot).

In view of the above description, it will be appreciated that the deletion of a snapshot or of one or more files/directories/virtual inodes of a snapshot can be provided employing less memory, processing power, energy and/or time than current technologies, such as due to avoiding "directory tree walking". This can be at least in part because the operations employed by the computing device 102 and/or snapshot component 106 can be executed without any updating (e.g., writing, renaming, rewriting and/or the like) of a namespace. That is, the overall quantity of metadata updates employed to delete a snapshot can be reduced as compared to existing techniques. Indeed, the time and waste of temporarily and in some cases continuously updating a namespace during a snapshot deletion can be fully avoided.

Similarly, the deletion of a snapshot can be performed without any reading of and/or writing to any directories of the snapshot, such as to determine one or more file objects, and thus one or more data blocks and/or metadata blocks defining and/or comprised by the file objects. Rather, mapping at the IMF instead can be read. The directories can be classified as (e.g., treated as) version files and deleted (e.g., released and/or truncated) based on the one or more data blocks and/or metadata blocks comprised by and/or defining the directories.

Example Process Flows of Example Snapshot Deletion Processes

Figure 7:
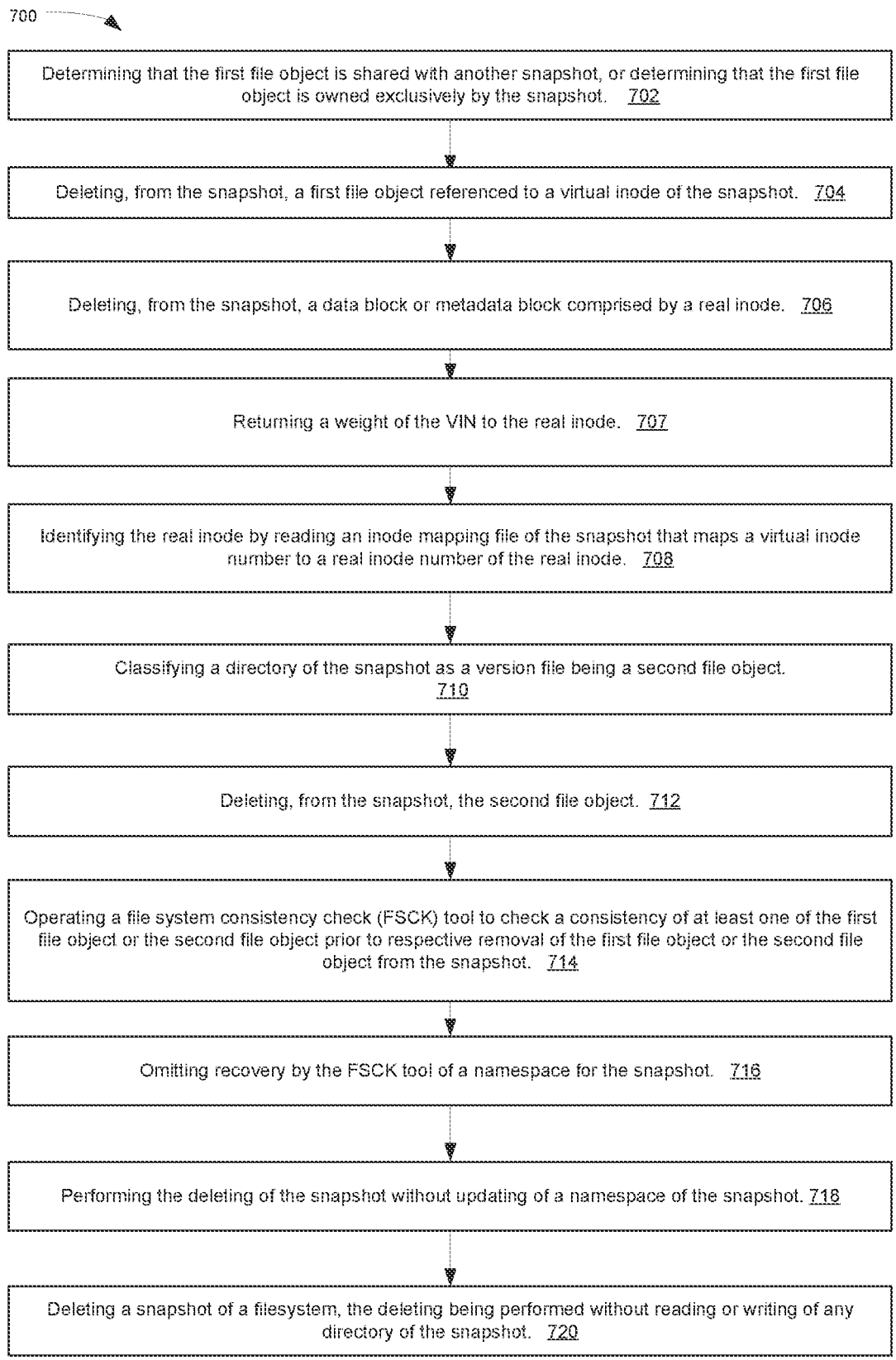
FIG. 7 illustrates a flow diagram of example operations of another process that can facilitate deletion of a snapshot or one or more portions of a snapshot, in accordance with one or more embodiments described herein.

Turning now to FIGS. 6, 7 and 8, respective example processes 60, 700 and 800 are illustrated comprising various operations for facilitating performance of a snapshot delete.

FIG. 6 summarizes various example operations, e.g., corresponding to a machine-readable storage medium, comprising executable instructions that, when executed by a processor, can facilitate performance of operations for a snap delete (e.g., deletion of a snapshot and/or portion of a snapshot. In an embodiment, the example operations can be comprised by and/or define a snapshot deletion process 600, in accordance with one or more embodiments described herein. The deletion process 600 is described at FIG. 6 with reference to FIGS. 1 and 2 for purposes of adequate illustration. That is, the aspects, elements, objects and/or components referenced in the example operations of deletion process 600 can be those of architecture 100 and/or diagram 200. Repetitive description of like elements and/or processes employed in respective embodiments is omitted for sake of brevity.

Operation 602 can comprise, to delete a snapshot or a portion of a snapshot of a real filesystem, (e.g., real filesystem 104), reading, by the system (e.g., snapshot component 106), an inode mapping file (IMF) of the snapshot that indexes a virtual inode number (VIN) corresponding to a real inode.

Operation 604 can comprise identifying, by the system (e.g., snapshot component 106), the real inode of the snapshot referenced to the VIN.

Operation 606 can comprise identifying, by the system (e.g., snapshot component 106), a file object (e.g., a file, directory, version file and/or the like) corresponding to the real inode.

Operation 608 can comprise determining, by the system (e.g., snapshot component 106), whether the file object is shared with another snapshot or is owned exclusively by the snapshot.

Operation 610 can comprise deleting, by the system (e.g., snapshot component 106), the file object from the snapshot. That is, based on a result of the determining being that the file object is shared, the file object can be released from the snapshot. Alternatively, based on a result of the determining being that the file object is owned exclusively by the snapshot, the file object can be truncated from the real inode.

Operation 612 can comprise, releasing, by the system (e.g., snapshot component 106), a weight of a VIN corresponding to the file object, wherein the weight is released to the real inode corresponding to the VIN, in accordance with mapping of the IMF.

Operation 614 can comprise deleting, by the system (e.g., snapshot component 106), a directory of the snapshot, wherein the file object is the directory, by addressing one or more data blocks or metadata blocks defining the directory. That is, as indicated above, the directory can be classified (e.g., treated as) a version file.

FIG. 7 summarizes various example operations, e.g., corresponding to a machine-readable storage medium, comprising executable instructions that, when executed by a processor, can facilitate performance of operations for a snap delete (e.g., deletion of a snapshot and/or portion of a snapshot. In an embodiment, the example operations can be comprised by and/or define a snapshot deletion process 700, in accordance with one or more embodiments described herein. The deletion process 700 is described at FIG. 7 with reference to FIGS. 1 and 2 for purposes of adequate illustration. That is, the aspects, elements, objects and/or components referenced in the example operations of deletion process 700 can be those of architecture 100 and/or diagram 200. Repetitive description of like elements and/or processes employed in respective embodiments is omitted for sake of brevity.

Operations 702-712 can comprise deleting, by the system (e.g., snapshot component 106), a snapshot of a filesystem, which deleting can comprise various operations performed relative to various file objects of the snapshot.

Operation 702 can comprise determining, by the system (e.g., snapshot component 106), that the first file object is shared with another snapshot, or determining that the first file object owned exclusively by the snapshot. Accordingly, the deleting operations 704, 706 and 712 can comprise a release and/or a truncation of the first file object dependent upon a result of the determining.

Put another way, the determining at operation 702 can comprise: determining that the first file object is shared with another snapshot, or determining that the first file object is owned exclusively by the snapshot. As such, the deleting, from the snapshot, of the first file object can be performed as a release of the first file object from the snapshot or as a truncation of the first file object from the snapshot, dependent upon a result of the determining.

Operation 704 can comprise deleting, by the system (e.g., snapshot component 106), from the snapshot, a first file object referenced to a virtual inode of the snapshot.

Operation 706 can comprise deleting, by the system (e.g., snapshot component 106), from the snapshot, a data block or metadata block comprised by a real inode. The data block or metadata block can comprise data for an on disk representation of a directory or for an on disk representation of the virtual inode.

At operation 707, the deleting, by the system (e.g., snapshot component 106), of the second file object can further comprise returning, by the system (e.g., snapshot component 106) a weight of the VIN to the real inode.

Operation 708 can comprise identifying, by the system (e.g., snapshot component 106), the real inode by reading an inode mapping file of the snapshot that maps a virtual inode number to a real inode number of the real inode.

Operation 710 can comprise classifying, by the system (e.g., snapshot component 106), a directory of the snapshot as a version file being a second file object.

Operation 712 can comprise deleting, by the system (e.g., snapshot component 106), from the snapshot, the second file object.

Operation 714 can comprise operating, by the system (e.g., processor 107), a filesystem consistency check (FSCK) tool (e.g., FSCK tool 180) to check a consistency of at least one of the first file object or the second file object prior to respective deletion of the first file object or the second file object from the snapshot.

Operation 716 can comprise omitting by the system (e.g., processor 107), recovery by the FSCK tool (e.g., FSCK tool 180) of a namespace for the snapshot.

Operation 718 can comprise performing, by the system (e.g., snapshot component 106), the deleting of the snapshot without updating of a namespace of the snapshot.

Operation 720 can comprise deleting, by the system (e.g., snapshot component 106), a snapshot of a filesystem, the deleting being performed without reading or writing of any directory of the snapshot.

FIG. 8 summarizes various example operations, e.g., corresponding to a machine-readable storage medium, comprising executable instructions that, when executed by a processor, can facilitate performance of operations relative to a snap delete (e.g., deletion of a snapshot and/or portion of a snapshot. In an embodiment, the example operations can be comprised by and/or define a snapshot deletion process 800, in accordance with one or more embodiments described herein. The deletion process 800 is described at FIG. 8 with reference to FIGS. 1 and 2 for purposes of adequate illustration. That is, the aspects, elements, objects and/or components referenced in the example operations of deletion process 800 can be those of architecture 100 and/or diagram 200. Repetitive description of like elements and/or processes employed in respective embodiments is omitted for sake of brevity.

Operation 802 can comprise identifying, by a system comprising a processor (e.g., processor 107), file objects of a snapshot via reading of an inode mapping file associated with the snapshot. The file objects can comprise a directory, for example.

In one or more embodiments, the identifying does not comprise walking any directory tree of the snapshot.

Operation 804 can comprise releasing, by the system (e.g., snapshot component 106), at least some of the file objects, wherein the releasing does not comprise updating a namespace of the snapshot.

Operation 806 can comprise classifying, by the system (e.g., snapshot component 106), a directory of the snapshot as a version file.

Operation 808 can comprise truncating, by the system (e.g., snapshot component 106), the directory without reading or writing of the directory.

Operation 810 can comprise returning, by the system (e.g., snapshot component 106), a weight of a virtual inode referencing a first file object, of the file objects that are released, to a real inode mapped to the virtual inode, in accordance with mapping at the inode mapping file.

Operation 812 can comprise determining, by the system (e.g., snapshot component 106), which first ones of the file objects are individually shared with another snapshot and which second ones of the file objects are owned exclusively by the snapshot.

Operation 814 can comprise performing, by the system (e.g., snapshot component 106), the releasing, or alternatively performing, by the system (e.g., snapshot component 106), a truncating, for respective ones of the first ones and second ones of the file objects depend on a result of the determining.

Operation 816 can comprise performing, by the system (e.g., snapshot component 106), the releasing, or alternatively performing, by the system (e.g., snapshot component 106), a truncating, of multiple file objects of the file objects in parallel at a given point in time.

For simplicity of explanation, the computer-implemented methodologies and/or processes provided herein are depicted and/or described as a series of acts. It is to be understood and appreciated that the subject innovation is not limited by the acts illustrated and/or by the order of acts, for example acts can occur in one or more orders and/or concurrently, and with other acts not presented and described herein. It can be appreciated that the operations of process flows of processes 600, 700 and/or 800 are example operations, and that there can be one or more embodiments that implement more or fewer operations than are depicted.

Furthermore, not all illustrated acts can be utilized to implement the computer-implemented methodologies in accordance with the described subject matter. In addition, those skilled in the art will understand and appreciate that the computer-implemented methodologies could alternatively be represented as a series of interrelated states via a state diagram or events. Additionally, it should be further appreciated that the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, technology described herein can perform deletion of a snapshot or portion thereof. In an embodiment, such as of FIGS. 1 and 2, a system 102 can comprise a processor 107 and a memory 109 that stores executable instructions that, when executed by the processor 107, can facilitate performance of operations. The operations can comprise, to delete a snapshot (e.g., FS1), or a portion of a snapshot, of a real filesystem 104, reading an inode mapping file (IMF) (e.g., IMF 224(1)) of the snapshot that indexes a virtual inode number (VIN) (e.g., VIN j or k) corresponding to a real inode (e.g., corresponding to RIN a, b or c). The operations further can comprise identifying the real inode (e.g., corresponding to RIN a, b or c) of the snapshot (e.g., FS1) referenced by the VIN (e.g., VIN i, j or k), identifying a file object (e.g., having file data a, b or c) corresponding to the real inode (e.g., corresponding to RIN a, b or c), and deleting the file object (e.g., having file data a, b or c) from the snapshot (e.g., FS1).

Relative instead to FIG. 3, the operations can comprise, to delete a snapshot 301, or a portion of a snapshot 301, of a real filesystem 104, reading an inode mapping file (IMF) 302 of the snapshot 301 that indexes a virtual inode number (VIN) 304 corresponding to a real inode 310 (e.g., via a RIN 308). The operations further can comprise identifying the real inode 310 of the snapshot 301 referenced by the VIN 308, identifying a file object 311 corresponding to the real inode 310, and deleting the file object 311 from the snapshot 301.

In view of employment of the one or more embodiments described herein, such as of the computing device 102, deletion of a snapshot, or deletion of one or more files/directories/virtual inodes of a snapshot, can be provided employing less memory, processing power, energy and/or time than current technologies, such as due to avoiding "directory tree walking". This can be at least in part because the operations employed by the one or more embodiments described herein, such as comprising the deletion processes 600, 700 and/or 800, can be employed without any updating (e.g., writing, renaming, rewriting and/or the like) of a namespace. Further, the one or more advantages can be a result of the deletions described herein being performed without any reading of and/or writing to any directories of the snapshot, such as to determine one or more files to address and/or delete. Rather, a respective inode mapping file (IMF) of the snapshot can be employed to track VINs to RINs to file objects. Additionally, the directories, which can be file objects, can be classified as (e.g., treated as) version files and deleted (e.g., released and/or truncated) based on the one or more data blocks and/or metadata blocks comprised by and/or defining the directories.

A practical application of one or more techniques performed by one or more embodiments described herein can be deletion of a snapshot, or deletion of one or more files/directories/virtual inodes of a snapshot, without wasted namespace updates. Indeed, for example, where a file of a directory is deleted from a snapshot, and the directory also will be deleted from the snapshot, rewriting of a namespace after the deletion can be only temporary. Instead, according to the one or more embodiments describe herein, the namespace can be allowed to become invalid, such as until the deletion is completed for the snapshot. That is, the FSCK tool can bypass and/or be directed to bypass such namespace writing/rewriting.

In one example, as one real-world result of performance of operations described herein can be reduced cost (e.g., power, money, memory, processing power and/or the like) related to the snapshot deletion. Accordingly, one or more operations related to adding capacity, bringing new servers online, improving reliability of access, managing load balancing, managing migration of files, backup of files, migrating files from legacy to new technology can be facilitated more easily and/or efficiently.

The systems and/or devices have been (and/or will be further) described herein with respect to interaction between one or more components. It should be appreciated that such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

It is to be appreciated that one or more embodiments described herein are inherently and/or inextricably tied to computer technology and cannot be implemented outside of a computing environment. For example, one or more processes performed by one or more embodiments described herein can more efficiently, and even more feasibly, provide program and/or program instruction execution as compared to existing systems and/or techniques. Systems, computer-implemented methods and/or computer program products facilitating performance of these processes are of great utility in the field of data storage and cannot be equally practicably implemented in a sensible way outside of a computing environment.

It also is to be appreciated that one or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively manage and/or delete data and/or metadata related to a virtual snapshot in the time that one or more embodiments described herein can facilitate this process. And, neither can the human mind nor a human with pen and paper electronically manage and/or delete data and/or metadata related to a virtual snapshot as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Computing Environment

Figure 9:
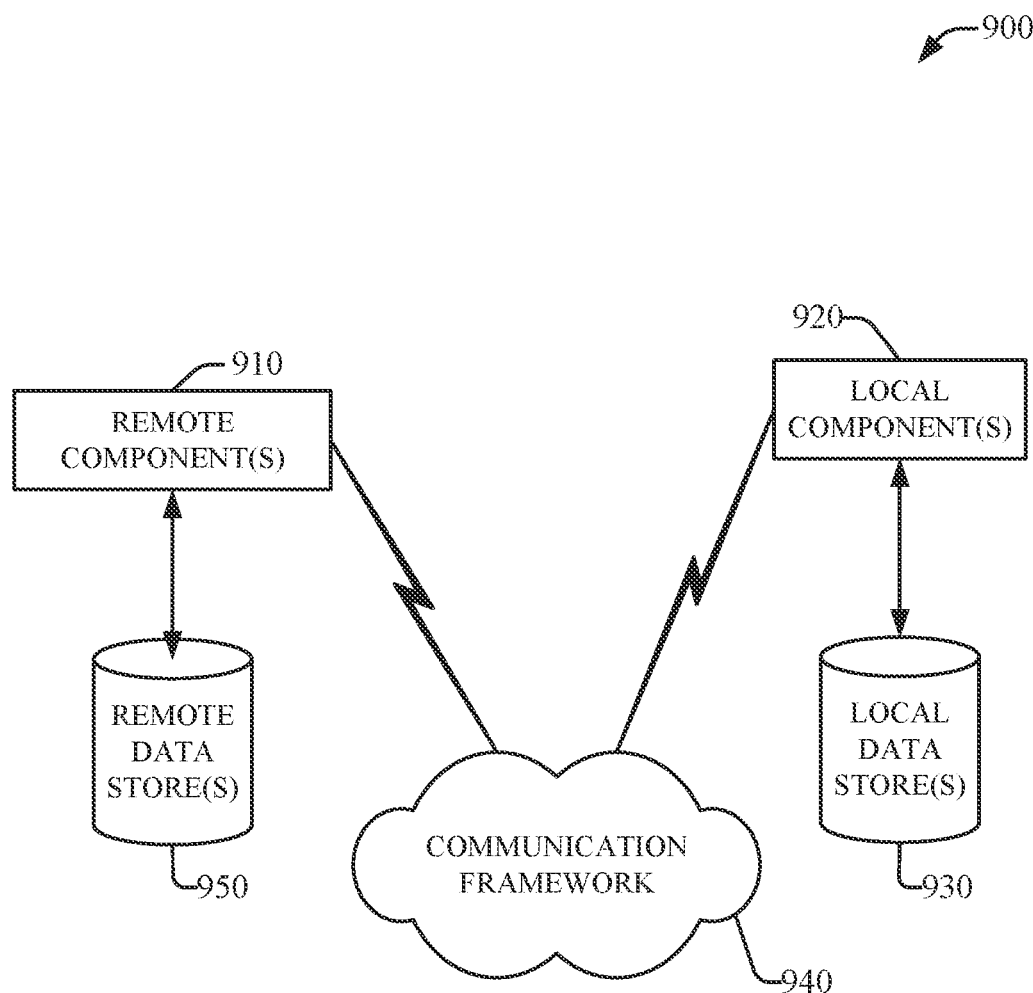
FIG. 9 illustrates a block diagram of an example computing environment into which embodiments of the subject matter described herein can be incorporated.

FIG. 9 is a schematic block diagram of a computing environment 900 with which the described subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Example Operating Environment

Figure 10:
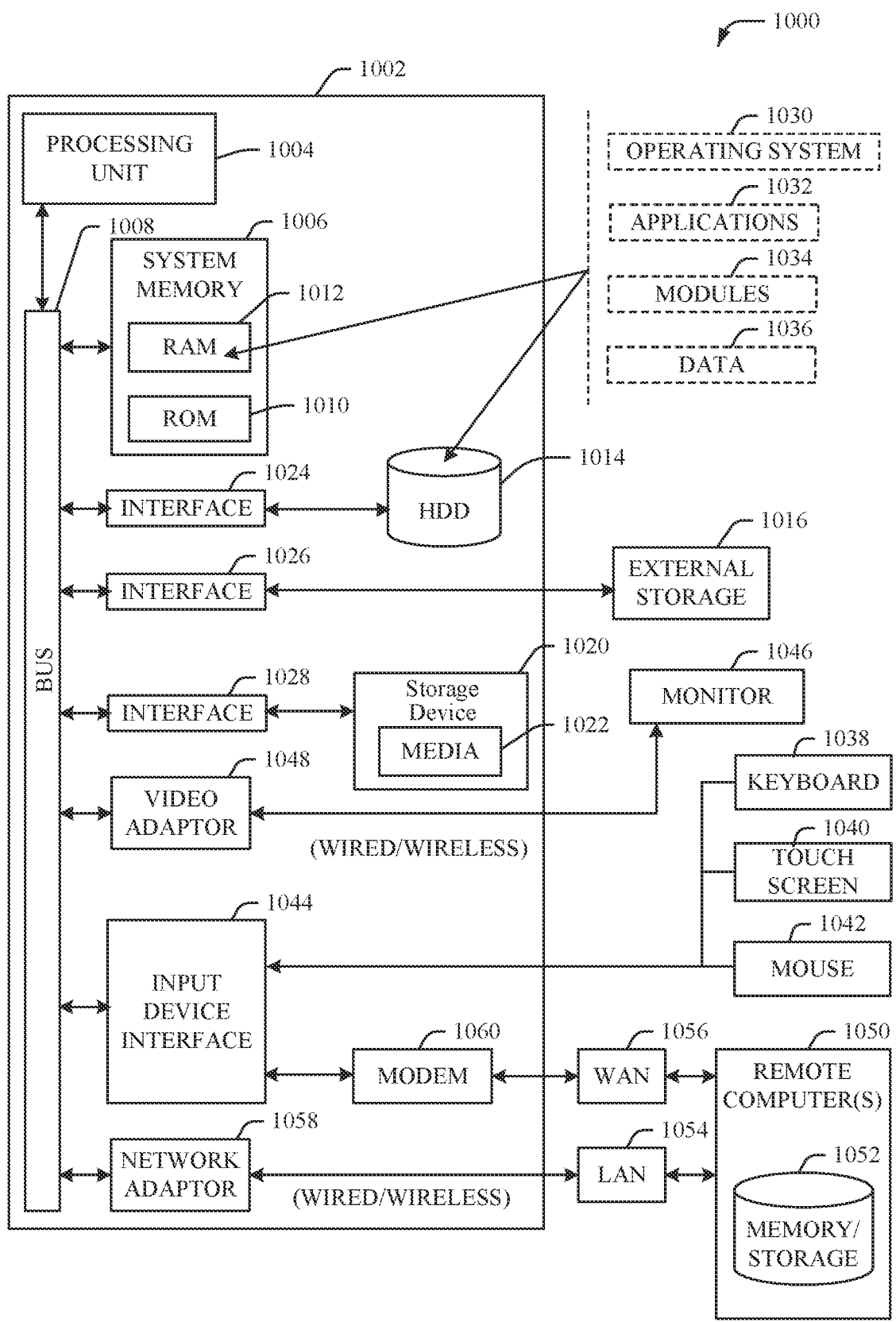
FIG. 10 illustrates an example schematic block diagram of a computing environment with which the subject matter described herein can interact and/or be implemented at least in part, in accordance with various embodiments and implementations described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 10, the example operating environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding Figures, where applicable, it is to be understood that other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the one or more specific forms described, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
  a processor; and
  a memory that stores executable instructions that, when executed by the processor, facilitate performance of operations, comprising:
    deleting a snapshot of a real filesystem, the deleting comprising:
      reading an inode mapping file (IMF) of the snapshot that indexes a virtual inode number (VIN) corresponding to a real inode;
      using the IMF, identifying the real inode of the snapshot referenced to the VIN;
      using the IMF, identifying a file object corresponding to the real inode; and
      deleting the file object from the snapshot.

2. The system of claim 1, wherein the deleting the snapshot further comprises
reading of the IMF of the snapshot without any reading of or writing to any directories of the snapshot to delete the file object from the snapshot.

3. The system of claim 1, wherein the deleting the snapshot further comprises
deleting the file object from the snapshot without any updating of a namespace of the snapshot.

4. The system of claim 1, wherein the deleting the snapshot further comprises
determining whether the file object is shared with another snapshot or is owned exclusively by the snapshot prior to deleting the snapshot.

5. The system of claim 4, wherein the deleting the file object from the snapshot comprises,
based on a result of the determining being that the file object is shared, releasing the file object from the snapshot; or
based on a result of the determining being that the file object is owned exclusively by the snapshot, truncating the file object from the real inode.

6. The system of claim 1, wherein the deleting the snapshot further comprises
releasing a weight of the VIN corresponding to the file object, wherein the weight is released to the real inode corresponding to the VIN, in accordance with mapping of the IMF.

7. The system of claim 1, wherein the deleting the file object from the snapshot comprises
deleting a directory of the snapshot, wherein the file object is the directory, by addressing one or more data blocks or metadata blocks defining the directory.

8. A non-transitory machine-readable medium, comprising executable instructions that, when executed by a processor, facilitate performance of operations, comprising:
deleting a snapshot of a filesystem, wherein the deleting is performed without reading or writing of any directory of the snapshot, and wherein the deleting comprises
determining that a first file object referenced to a virtual inode of a snapshot is to be deleted,
deleting, from the snapshot, the first file object,
determining that a directory of the snapshot is to be deleted,
classifying the directory of the snapshot as a version file being a second file object, and
deleting, from the snapshot, the second file object.

9. The non-transitory machine-readable medium of claim 8, wherein the operations further comprise:
performing the deleting of the snapshot by omitting any updating of a namespace of the snapshot to delete the first file object and the second file object.

10. The non-transitory machine-readable medium of claim 8, wherein the deleting the snapshot further comprises
in response to determining that the first file is to be deleted, determining that the first file object is shared with another snapshot, or
in further response to the determining that the first file is to be deleted, determining that the first file object is owned exclusively by the snapshot,
wherein the deleting of the first file object, from the snapshot, is performed as a release of the first file object from the snapshot or as a truncation of the first file object from the snapshot, dependent upon a result of the determining that the first file object is at least one of shared with the other snapshot or owned exclusively by the snapshot.

11. The non-transitory machine-readable medium of claim 10, wherein the deleting the snapshot further comprises
deleting, from the snapshot, a data block or metadata block comprised by a real inode to which the virtual inode is mapped, and
in response to the deleting of the data block or the metadata block, returning a weight of a virtual inode number (VIN), indexed to the virtual inode, to the real inode.

12. The non-transitory machine-readable medium of claim 11, wherein the real inode is identified by reading an inode mapping file of the snapshot that maps the VIN to a real inode number of the real inode.

13. The non-transitory machine-readable medium of claim 8, wherein the deleting the snapshot further comprises
operating a filesystem consistency check (FSCK) tool to check a consistency of at least one of the first file object or the second file object prior to the respective deletion of the first file object or the second file object from the snapshot; and
omitting recovery, by the FSCK tool, of a namespace for the snapshot.

14. A method, comprising:
identifying, by a system comprising a processor, file objects of a snapshot, which file objects are to be deleted from the snapshot, by reading of an inode mapping file associated with the snapshot; and
deleting the file objects from the snapshot, wherein the deleting comprises releasing at least some of the file objects that were identified from the snapshot, wherein the releasing comprises omitting updating a namespace of the snapshot to release the at least some of the file objects from the snapshot.

15. The method of claim 14, wherein the identifying comprises omitting walking any directory tree of the snapshot to release the at least some of the file objects from the snapshot.

16. The method of claim 14, wherein the file objects comprise a directory of the snapshot.

17. The method of claim 16, further comprising:
classifying the directory of the snapshot as a version file; and
truncating the directory without reading or writing of the directory.

18. The method of claim 14, further comprising:
returning a weight of a virtual inode referencing a first file object, of the file objects that are released, to a real inode mapped to the virtual inode, in accordance with mapping at the inode mapping file.

19. The method of claim 14, further comprising:
determining which first ones of the file objects are individually shared with another snapshot and which second ones of the file objects are owned exclusively by the snapshot; and
performing the releasing, or alternatively performing a truncating, for respective ones of the first ones and second ones of the file objects dependent on a result of the determining.

20. The method of claim 14, further comprising:
performing the releasing, or alternatively performing a truncating, of multiple file objects of the file objects in parallel at a given point in time.

* * * * *